United States Patent
Forsblom et al.

(10) Patent No.: US 9,256,358 B2
(45) Date of Patent: Feb. 9, 2016

(54) MULTIPLE PANEL TOUCH USER INTERFACE NAVIGATION

(71) Applicant: ADTILE TECHNOLOGIES INC., La Quinta, CA (US)

(72) Inventors: Nils Forsblom, La Quinta, CA (US); Joao Cardoso, Helsinki (FI); Kim Niklas Stenbäck, Porvoo (FI)

(73) Assignee: ADTILE TECHNOLOGIES INC., San Diego, CA (US)

( * ) Notice: Subject to any disclaimer, the term of this patent is extended or adjusted under 35 U.S.C. 154(b) by 97 days.

(21) Appl. No.: 13/958,462

(22) Filed: Aug. 2, 2013

(65) Prior Publication Data

US 2014/0365964 A1 Dec. 11, 2014

Related U.S. Application Data

(60) Provisional application No. 61/833,338, filed on Jun. 10, 2013.

(51) Int. Cl.
*G06F 3/0488* (2013.01)
*G06Q 50/00* (2012.01)

(52) U.S. Cl.
CPC .......... *G06F 3/0488* (2013.01); *G06F 3/04886* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,245,155 B2 * | 8/2012 | Nakajima et al. | 715/833 |
| 8,560,975 B2 * | 10/2013 | Beaver et al. | 715/863 |
| 8,624,851 B2 * | 1/2014 | Kim et al. | 345/173 |
| 2008/0276200 A1 * | 11/2008 | Bamford et al. | 715/841 |
| 2009/0064055 A1 * | 3/2009 | Chaudhri et al. | 715/863 |
| 2010/0001980 A1 * | 1/2010 | Kim | G06F 1/1626 345/184 |
| 2010/0214237 A1 * | 8/2010 | Echeverri et al. | 345/173 |
| 2011/0050594 A1 * | 3/2011 | Kim et al. | 345/173 |
| 2011/0131537 A1 * | 6/2011 | Cho et al. | 715/863 |
| 2011/0167387 A1 * | 7/2011 | Stallings et al. | 715/826 |
| 2011/0252375 A1 * | 10/2011 | Chaudhri | 715/835 |
| 2012/0011437 A1 * | 1/2012 | James | G06F 1/1643 715/702 |
| 2012/0023462 A1 * | 1/2012 | Rosing et al. | 715/863 |
| 2012/0105464 A1 * | 5/2012 | Franceus | 345/581 |
| 2012/0227077 A1 * | 9/2012 | Spivack et al. | 725/110 |
| 2013/0055119 A1 * | 2/2013 | Luong | 715/764 |
| 2013/0111395 A1 * | 5/2013 | Ying et al. | 715/783 |
| 2013/0151974 A1 * | 6/2013 | Cho et al. | 715/733 |
| 2013/0227418 A1 * | 8/2013 | Sa et al. | 715/728 |
| 2013/0227455 A1 * | 8/2013 | Lee et al. | 715/769 |
| 2014/0115467 A1 * | 4/2014 | Bachman et al. | 715/716 |
| 2014/0137020 A1 * | 5/2014 | Sharma | G06F 3/0486 715/769 |

* cited by examiner

*Primary Examiner* — Hien Duong
(74) *Attorney, Agent, or Firm* — Stetina Brunda Garred & Brucker

(57) ABSTRACT

A graphical user interface method is disclosed. A first interface panel including a first graphical content for a first menu item is generated. The first interface panel is displayed in a primary display area, and a first descriptor is displayed in a menu display area that is segregated from the primary display area. The first descriptor is associated with the first menu item. An input command is received on the menu display area, and in response thereto, a second interface panel with a second set of graphic content for a second menu item is generated. An input command transition relationship is defined between the first interface panel and the second interface panel, and the received input command corresponds thereto. The second interface panel is displayed in the primary display area, and a second descriptor associated with the second menu item is displayed in the menu display area.

14 Claims, 4 Drawing Sheets

MULTIPLE PANEL TOUCH USER INTERFACE NAVIGATION

CROSS-REFERENCE TO RELATED APPLICATIONS

This application relates to and claims the benefit of U.S. Provisional Application No. 61/833,338 filed Jun. 10, 2013 and entitled "MULTIPLE PANEL TOUCH USER INTERFACE NAVIGATION," the entire contents of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to graphical user interfaces, and more particularly, to multiple panel touch user interface navigation on mobile computing devices and other small form factor applications with limited screen real estate.

2. Related Art

Modern smartphone devices represent the convergence of functions traditionally performed by dedicated devices, such as cellular phones for voice communications, personal digital assistants (PDAs) for calendaring, task lists, address books, memos, and the like, digital cameras for still and motion picture capture, GPS (global positioning system) mapping devices for navigation, and so forth. Not only are these basic features integrated into a single device, it is possible for smartphones to run various third party applications that provide additional functionality. This has been possible because smartphones incorporate general purpose data processors with power and capabilities approaching those of conventional personal computers. Due to their relatively low power requirements and reduced complexity, ARM architecture processors have been favored for mobile device applications. In addition to the basic communications and networking components, the processors can cooperate with a wide variety of input/output devices, including displays capable of rendering complex graphics, touch screens, and audio chipsets.

Management of these hardware components is performed by a mobile operating system, also referenced in the art as a mobile platform. Currently, popular mobile platforms include Android from Google, Inc., iOS from Apple, Inc., and Windows Phone, from Microsoft, Inc. These three platforms account for over 98.6% share of the domestic U.S. market. Use of mobile operating systems is not limited to smartphones, and other mobile devices such as tablets also utilize the same hardware processor and software platform.

The mobile operating system provides several fundamental software modules and a common input/output interface that can be used by third party applications via application programming interfaces. This flexible development environment has led to an explosive growth in mobile software applications, also referred to in the art as "apps." Third party apps are typically downloaded to the target device via a dedicated app distribution system specific to the platform, and although there are a few simple restrictions to ensure a consistent user experience, developers have much freedom to implement a wide variety of functionalities that may prove valuable to an end user.

Many third party mobile apps were originally developed to fill voids in the existing functionality of a base smartphone system and development was focused on productivity features such as e-mail, calendars, and task lists. However, apps have extended to other functions, such as banking, news browsing, mobile gaming, social networking, location-based services and so forth. On a very general level, these features all involve downloading data from a remote site, rendering the same on the local device, and accepting commands based on that presented data, to which the remote site responds and provides additional data. Although such basic query-response transactions could be completed through the installed web browser, dedicated apps provide an additional layer of interactivity and presentation of function groupings that may not be possible via mobile web pages.

Almost by definition, smartphones and other mobile devices must have a small footprint for portability reasons. Depending on the manufacturer's specific configuration, the screen may be three to five inches diagonally. Any larger, and the device would be more appropriately categorized as a tablet or a miniature tablet. One of the inherent usability limitations associated with mobile devices is the reduced screen size; despite significant improvements in resolution allowing for smaller objects to be rendered clearly, buttons and other functional elements of the interface nevertheless occupy a large area of the screen because of visibility and human physiology limits, e.g., discerning and activating one small button among a cluster is difficult, if not impossible to achieve with consistency. However, because not as many functions of the app are immediately accessible, its utility may be diminished. As design compromises necessarily involve generalized assumptions of the needs of the user base, with possible key functions requiring a more complicated access sequence than others, the app may not be as useful.

Most conventional app user interfaces are structured similarly—in the uppermost section of the screen, basic status information regarding the device such as cellular signal strength, WiFi signal strength, time/date, Bluetooth activation status, GPS activation status, and battery/power status may be displayed. In almost all cases except full-screen games, this status information is persistent, and the space below is dedicated to the running app. A typical app includes a main window that displays content sandwiched between a top menu bar and a bottom menu bar. The top menu bar further includes further sub-menus through which other functions of the app may be invoked, while the bottom menu bar includes buttons for commonly used functions and/or screen panels. As indicated above, the size of these buttons are limited, and existing interfaces thus limit the number of immediately accessible functions. Accordingly, there is a need in the art for improved multiple panel touch user interface navigation.

BRIEF SUMMARY

One embodiment of the present disclosure contemplates a graphical user interface method. The method may begin with generating a first interface panel for a first menu item. The first interface panel may include a first set of graphical content. There may be a step of displaying the first interface panel in a primary display area. Additionally, there may be a step of displaying exclusively a first descriptor in a menu display area that is segregated from the primary display area. The first descriptor may be associated with the first menu item. There may also be a step of receiving an input command on the menu display area. The method may further include generating, in response to the input command, a second interface panel for a second menu item. The second interface panel may include a second set of graphical content different from the first set of graphical content. There may also be an input command transition relationship being defined between the first interface panel and the second interface panel. According to various embodiments, the received input command corresponds to the input command transition relationship. The method further includes a step of displaying the second interface panel in the primary display area, as well as displaying exclusively a second descriptor associated with the second menu item in the menu display area. The foregoing method may also be tangibly embodied as one or more programs of instructions executable by a data processing device and stored on computer-readable program storage media. The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Multiple panel touch user interface navigation on mobile computing devices is disclosed. The detailed description set forth below in connection with the appended drawings is intended as a description of the several presently contemplated embodiments thereof. It is not intended to represent the only form in which the disclosed invention may be developed or utilized. The description sets forth the functions and features in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
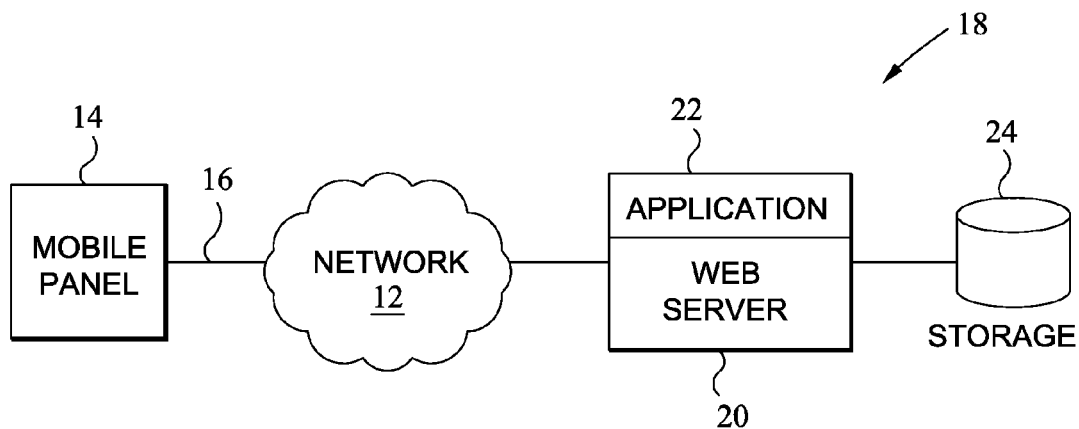
FIG. 1 is a block diagram illustrating one exemplary environment in which various embodiments of the present disclosure may be implemented, including client mobile devices and an exemplary networked service.

The disclosed graphical user interface is envisioned to allow a greater number of features to be immediately accessible from a primary screen of an application running on small form factor devices with limited display real estate. In this regard, with reference to the block diagram of FIG. 1 that illustrates an exemplary environment, various embodiments of the user interface may be implemented in connection therewith. Generally, there is a data communications network 12 over which information can be exchanged among connected nodes. The data communications network 12 is referenced in the broadest sense as encompassing any link or series of links over which data communications may proceed between nodes connected thereto. The Internet has one such existing infrastructure of independently operated services for implementing the functionality envisioned by the present disclosure. It should be understood that any other suitable data communications network may be substituted.

Among the nodes connected to the data communications network 12 is a mobile communications device 14, which is understood to be a smartphone that can place and receive telephone calls, as well as send and receive data over a cellular communications network. In this regard, the mobile communications device 14 is understood to include wireless transceiver modules that establish a link 16 to the data communications network 12. Those having ordinary skill in the art will recognize the various standardized modalities of the link 16, including different generations of GSM (Global System for Mobile Communications), EDGE (Enhanced Data rates for GSM Evolution), UMTS (Universal Mobile Telecommunications System), HSPA (High Speed Packet Access) and others. Local area wireless networking technologies such as IEEE 802.11x (WiFi) are also typically incorporated into the mobile communications devices 14.

The data communications facilities are utilized by various interactive software applications such as web browsers, e-mail managers, and others that embody the contemplated methods and perform the various steps thereof. In this regard, the mobile communications devices 14 have a central processing unit that executes the pre-programmed instructions, we well as a memory for storing the same. On a very general level, the particular operands and execution sequence of the instructions may be governed by various input parameters provided from input device components such as keypads, buttons, slide switches, and touch input screens. The results of executing the instructions may be shown on a display screen, which typically serves as the primary output modality of the mobile communications devices 14.

Every functional aspect of the mobile communications device may be controlled by the central processing unit. Accordingly, also connected to the central processing unit is the aforementioned wireless transceiver module. Almost all conventional devices also include a digital camera capable of recording still images, as well as video in conjunction with the audio input device. For mapping and other location-based features, such devices further include Global Positioning System (GPS) satellite receivers that output coordinate values corresponding to the current device position. Because image, video, and location capture are contemplated for various implementations, in a preferred though optional embodiment, the mobile communications devices 14 include the foregoing component devices.

Any other suitable data processing or computing devices such as desktop personal computers, notebook computers, tablets, and the like may also be utilized in connection with the various embodiments of the present disclosure. As will be recognized upon consideration of the entirety of the present disclosure, it will be appreciated that in many circumstances the mobile communications devices 14 are more convenient and likely to be kept closer on hand by the user to utilize the various features of the present disclosure. This does not mean, however, that such other data processing or computing devices could not be utilized. Thus, while the mobile communications devices 14 are referenced as being central to the present disclosure, they may be more generally referenced as user computer devices.

The mobile communications devices 14 can establish data transfer links with various connected Internet websites or an online service 18. As utilized herein, the term online service 18 is understood to be any networked computing resource to which requests for data can be initiated from the mobile communications devices 14, and fulfilled with data managed by the particular online service 18 being returned in response. The online service 18 may be comprised of multiple servers or computer systems each with processors, memory, data storage devices, and network interface devices managed by an operating system and running a web service application platform. The requests may be generated by web browser applications running on the mobile communications devices 14 upon direction by the user. Alternatively, application software, known colloquially as "apps," may be custom developed for a specific online service or multiple online services 18. The requests may also be initiated therefrom. Typically, regardless of whether the request is initiated by the web browser or the dedicated application, the Hypertext Transfer Protocol (HTTP) is utilized. The format of the returned data may vary, though standards such as text-based eXtensible Markup Language (XML) can be readily implemented.

One example online service 18 may be a photograph-based opinion polling system such as that disclosed in U.S. patent application Ser. No. 13/087,172 entitled "Social Network Recommendation Polling," the disclosure of which is hereby incorporated by reference in its entirety herein. The online service 18 is understood to be a computer system also including a central processor, a memory, input/output devices, and a network connection device, and has software instructions loaded thereon that, when executed, perform various functions supporting the contemplated methods of the present disclosure. In further detail, the online service 18 may be comprised of an HTTP or web server 20 that receives and responds to specific requests for data from corresponding web applications via the hypertext transfer protocol. To the extent the online service 18 functions in a capacity beyond mere transmission of data, such features may be implemented as separate software applications being executed by a web application server 22. Additionally, there is a database 24 that stores the additional data served by the online service 18. Continuing with the foregoing example of the photograph-based opinion polling system, such data may be photographs, polling results, selection options, and so forth.

One embodiment of the user interface is utilized in a dedicated app running on the mobile communications device 14 and particular to the online service 18. That is, all of the functionality is incorporated into a preprogrammed application loaded on the mobile communications device 14, and the needed data is downloaded from the online service 18. As noted above, it may be possible to implement the various features of the user interface via specialized client-side programming/scripts that are downloaded from the online service 18 and executed within a conventional general-purpose web browser application. Thus, although the features of the user interface will be discussed in the context of a dedicated mobile app, those having ordinary skill in the art will recognize that the same could be implemented in other contexts, even locally-executed applications that do not depend on a data communications modality.

Figure 2:
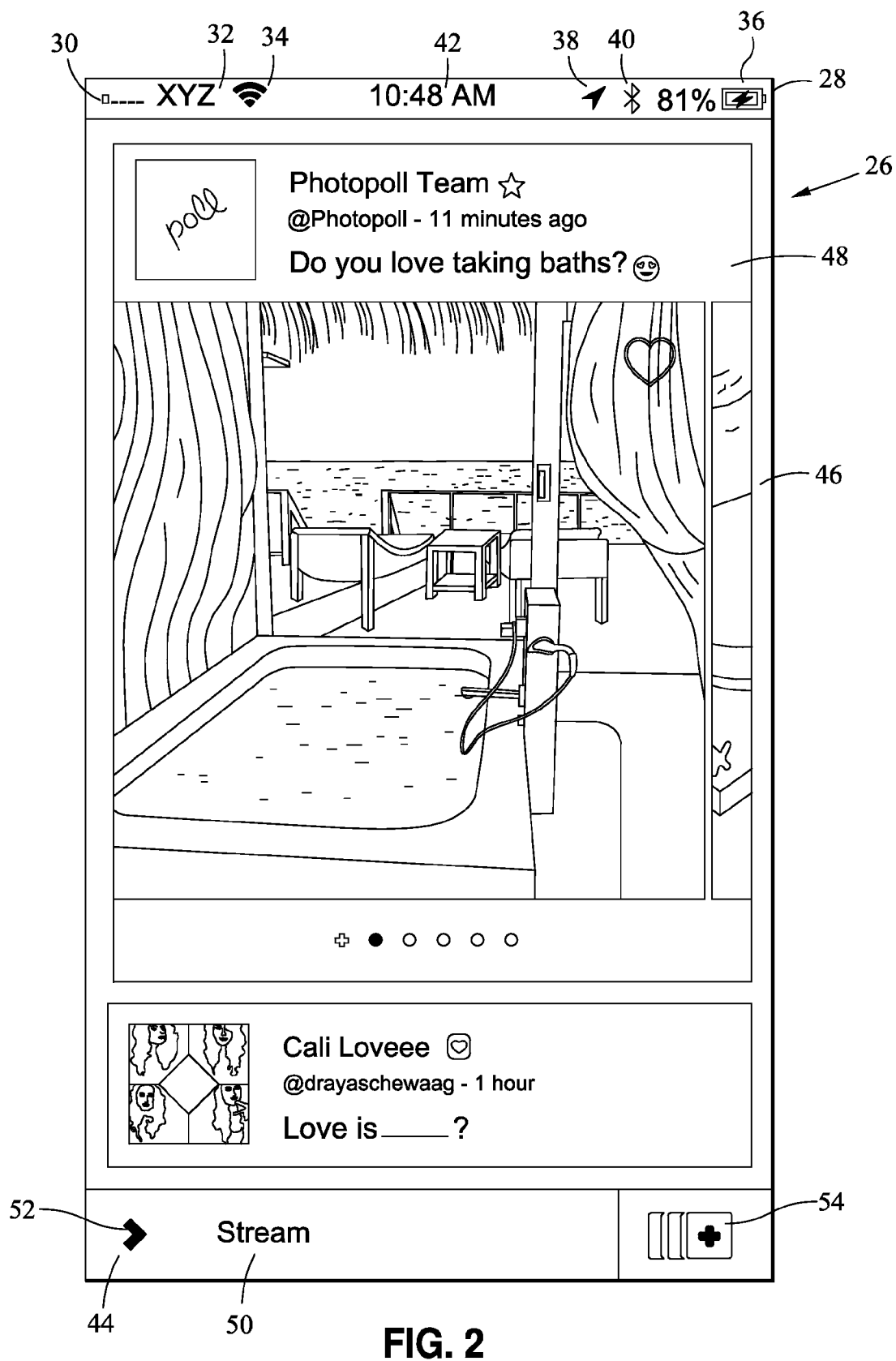
FIG. 2 is a screen capture of an example graphical user interface in accordance with one embodiment of the present disclosure with a first interface panel.

With reference to the example screen capture of FIG. 2, an exemplary user interface 26 for the dedicated app is shown. As is the case with typical mobile operating systems, there is a status bar 28 on the top of the user interface 26. Updated basic operational information about the mobile communications device 14 is shown, including a cellular network reception indicator 30, a cellular network carrier identifier 32, a WiFi network reception indicator 34, a power level indicator 36, a GPS activation status indicator 38, and a Bluetooth activation status indicator 40. Furthermore, there may also be a clock 42. The remainder of the display is dedicated to the user interface 26 of the app.

In accordance with one embodiment of the user interface 26, at the bottom thereof there is a menu display area 44, the details of which will be considered more fully below. The menu display area 44 is understood to occupy only a small portion of the remaining display area, with the majority of the space being allocated to a primary display area 46 for displaying content of interest, which, in the present example, are photographs and opinion polls based thereon. Thus, the menu display area 44 is segregated from the primary display area 46.

Figure 3:
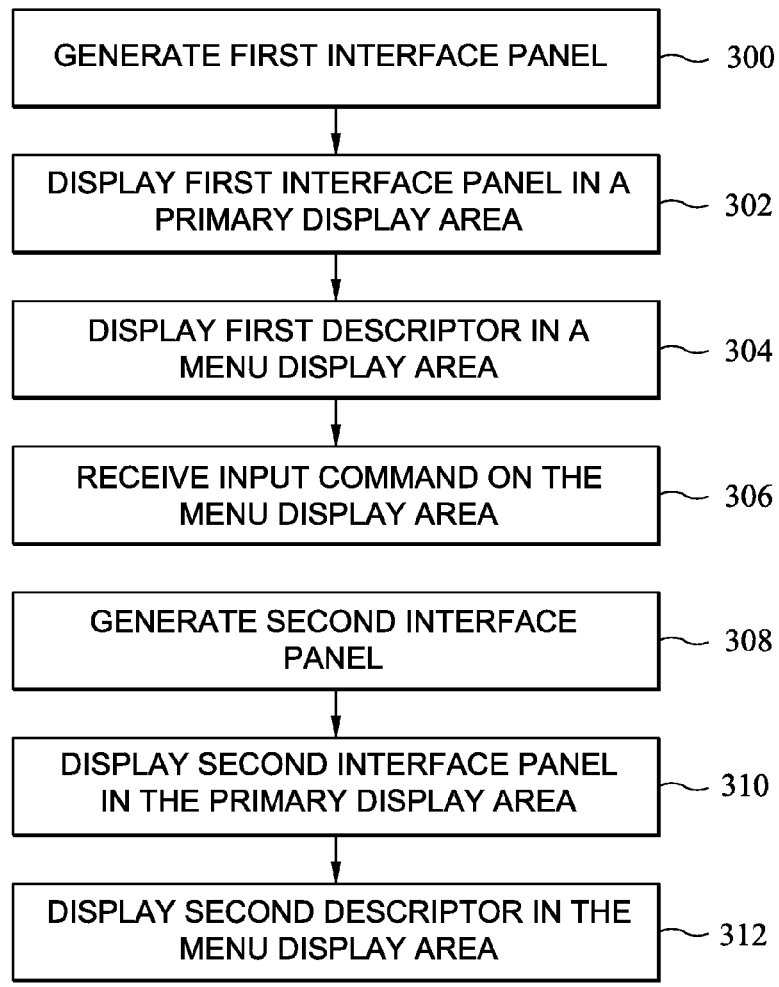
FIG. 3 is a flowchart depicting one embodiment of a graphical user interface method.

With reference to the flowchart of FIG. 3, a graphical user interface method begins with a step 300 of generating a first interface panel 48 for a first menu item. For example, the first menu item may be "Stream", and so the first interface panel 48 is likewise understood to be for a "Stream" function. Other menu items such as "Notification" are envisioned for the particular embodiment of the photograph-based opinion polling app of the illustrative example. However, such menu items are understood to be particular to the design and functional features of the app, and these are presented for exemplary purposes only and not of limitation. As utilized herein, generating the first interface panel 48 is understood to encompass the real-time download of content from the remote online service 18 and insertion of such data into a data structure representative of the first interface panel 48. The basic data structure may be pre-existing and already defined. Along these lines, the data to be included may already be on the mobile communications device 14; in such case, generating the first interface panel 48 may further include memory retrieval of the content data for inclusion.

The method continues with a step 302 of displaying the first interface panel 48 in the primary display area 46. By way of example, the "Stream" or first interface panel 48 displays a series of the most recently posted polls on the online service 18. In this regard, such photographs and polls may also be referred to as a first set of graphical content. The first interface panel 48 is understood to be independently navigable, that is, by inputting conventional touch screen swiping commands it is possible to scroll up and down to other interface panel elements showing different photograph-based polls. In such case, the menu display area 44 is understood to be persistent and remains static.

Along with the displaying of the first interface panel 48, there is a step 304 of displaying a first descriptor 50 that is associated with the first menu item. As shown, the first descriptor 50 is displayed within the menu display area 44. In one contemplated embodiment, the first descriptor 50 is exclusively displayed in the menu display area 44, that is, no other user interface element is displayed within. The illustrated example shows an arrow graphic element 52 as well as an expansion button 54 immediately adjacent to the menu display area, each at respective opposing sides, but these are understood to not be part of the menu display area.

The method continues with receiving an input command on the menu display area 44 in accordance with a step 306. In response to the input command, and with additional reference to the screen capture of FIG. 4, the method continues with a step 308 of generating a second interface panel 56 that corresponds to the "Notification" or second menu item. The step of generating as utilized herein as pertaining to the second interface panel 56 is understood to have the same meaning and scope as discussed above in relation to the same generating step as pertaining to the first interface panel 48. The second interface panel 56 includes a second set of graphical content that is different from the aforementioned first set of graphical content. In the example of the photograph-based opinion polling app, the "Notification" menu item may be for activities of other users that impacted some aspect of the account associated with the current user. For instance, the user may have posted a poll, and notifications may be generated whenever another user responds to such poll.

Figure 5:
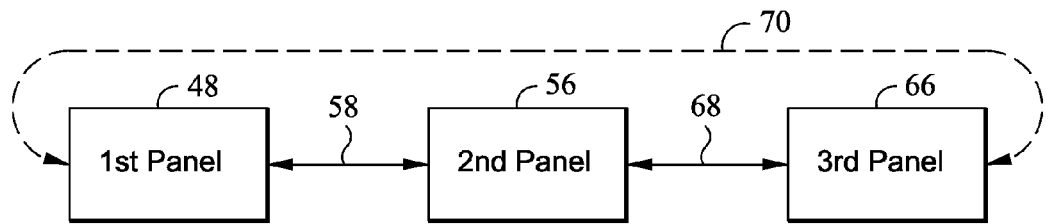
FIG. 5 is a block diagram illustrating the position relationships between various interface panels.
Figure 6:
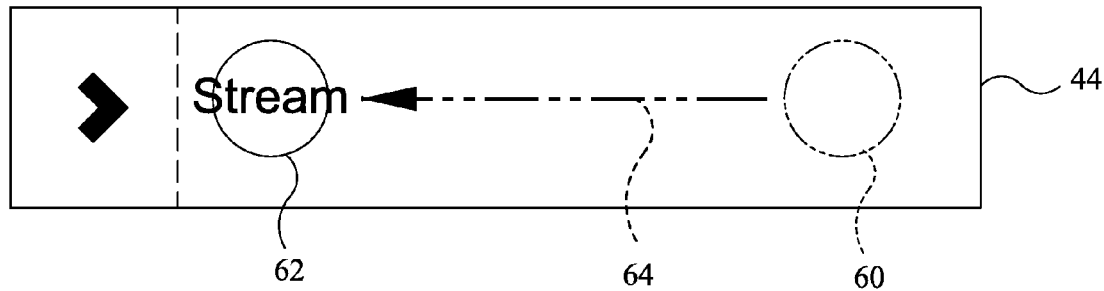
FIG. 6 is an excerpt of a menu display area of the graphical user interface for demonstrating swipe commands.

With reference to the diagram of FIG. 5, as between the first interface panel 48 and the second interface panel 56, there exists a first input command transition relationship 58 that corresponds to the received input command. As best illustrated in FIG. 6, the received input command is a touch "swipe," whereby the user places the finger at a starting point 60 within the menu display area 44, drags the finger across in a direction 64, and releases at an ending point 62. The input command is thus a left swipe, and an input command in the opposite direction than described is a right swipe. Referring back to the diagram of FIG. 5, the first interface panel 48 is understood to be related or connected to the second interface panel 56 in the rightward direction, and the second interface panel 56 is related or connected to the first interface panel 48 in the leftward direction. This connection is contemplated to refer to the first input command transition relationship 58. There may additionally be a third interface panel 66 that has a second input command transition relationship 68 as between the second interface panel 56, along with a third input command transition relationship 70 as between the first interface panel 48. Generally, the various interface panels are circularly arranged, with each input command effectuating a clockwise or counter-clockwise rotation to a specific one of focus.

It is thus possible to invoke a variety of functions of the app and navigate the same via inputs on the menu display area 44. The positioning of the menu display area 44 is such that only one hand need be utilized to navigate the app, and only a single thumb at that. Since newer mobile communications devices have a slightly larger footprint than predecessors, even the full articulation of the thumb cannot reach the outer peripheries of the touch input panel to activate a top menu bar. This forces the user to use both hands, but the presently contemplated menu display area 44 avoids such issues.

The graphical user interface method further includes a step 310 of displaying the second interface panel 56 in the primary display area 46, as well as a step 312 of displaying a second descriptor 72 that corresponds to the second "Notification" menu item in the menu display area 44. Again, no other graphic is shown in the menu display area 44, and so the second descriptor 72 can be described as being displayed exclusively.

Figure 4:
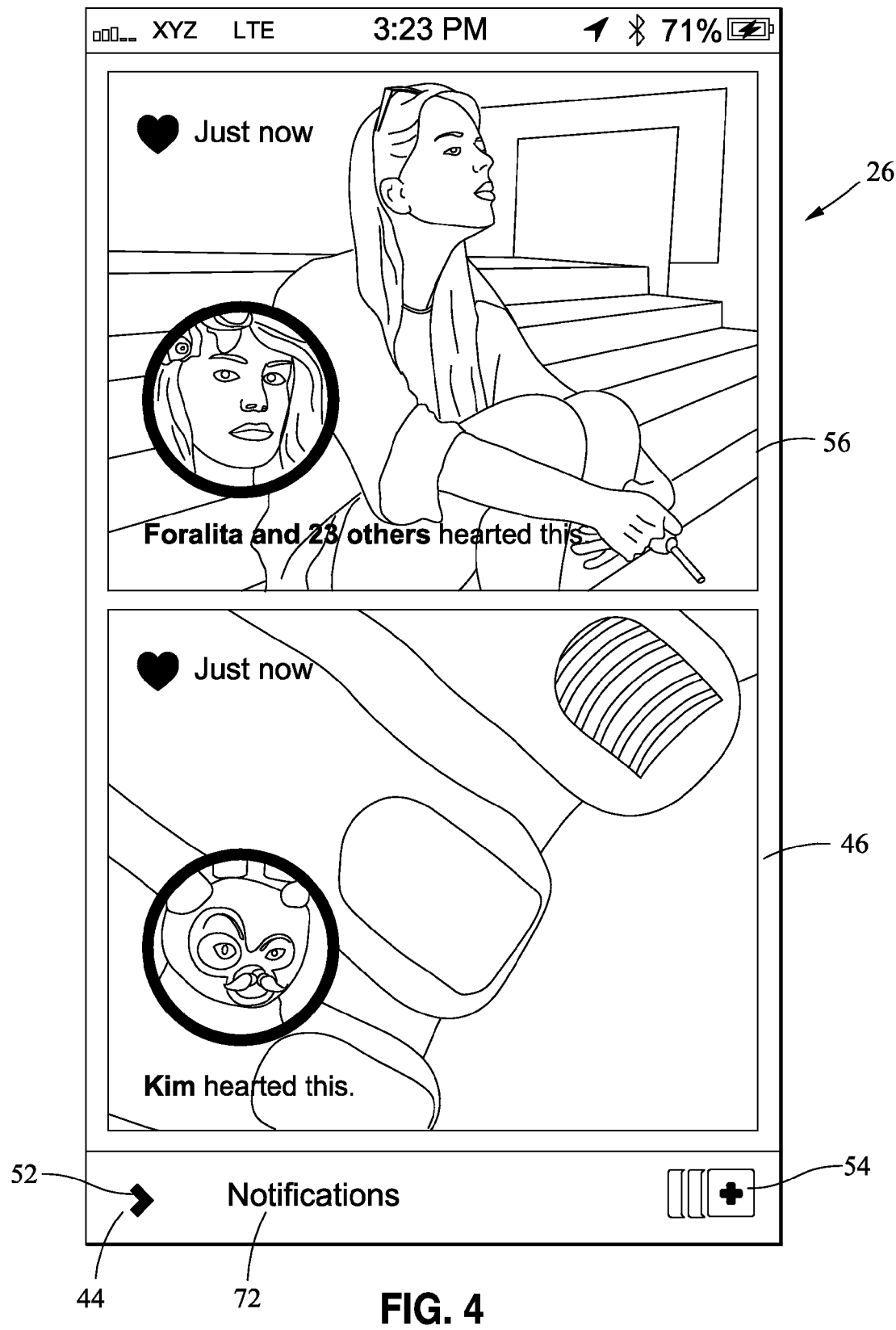
FIG. 4 is a screen capture of another example of the graphical user interface with a second interface panel.

The screen shot of FIG. 2 represents the state of the app before the input command, while the screen shot of FIG. 4 represents the state of the app after the input command, with the display of the second interface panel 56 and the second descriptor 72. One aspect of the present disclosure contemplates various transitions effects between these two states while the input is being completed. The simplest transition is to refresh the primary display area 46 and the menu display area 44 with the second interface panel 56 and the second descriptor 72, respectively once a threshold swipe distance has been detected.

Figure 7:
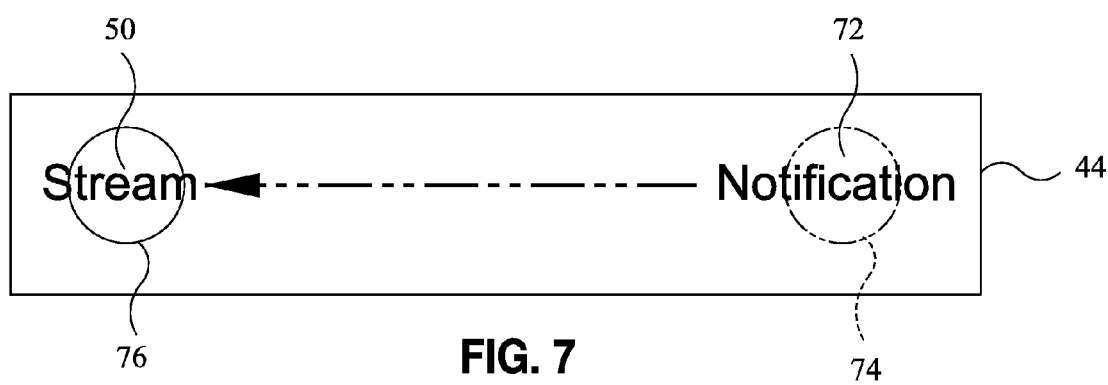
FIG. 7 shows an exemplary transition of the menu display area in response to user input.
Figure 8:
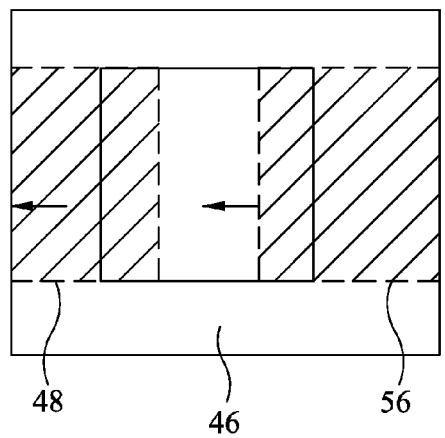
FIG. 8 shows an exemplary transition of the primary display area in response to user input.

A more user-friendly, intuitive implementation, however, may involve animated transition effects with respect to the primary display area 46 and/or the menu display area 44. FIG. 7 shows the menu display area 44 with a swipe input starting point 74, and as the input is moved toward the input ending point 76, the first descriptor 50 may move the same distance to the left and out of view as the second descriptor 72 moves the same distance to the left and into view, to complete the transition. A parallel animated transition effect of the primary display area 46 may also accompany the received input and the transitions occurring in the menu display area 44. With reference to FIG. 8, the first interface panel 48 may move to the left and out of view as the second interface panel 56 moves to the left and into view.

The animation of the menu display area 44 is understood to be independent of the animation of the primary display area 46. That is, it is not a requirement for the first interface panel 48 to gradually change to the second interface panel 56 along with the animated transitioning of the first descriptor 50 to the second descriptor 72. Thus it is possible to animate one of the menu display area 44 and the primary display area 46 but not the other, e.g., animate the menu display area 44 but not the primary display area 46, and vice versa. It will be appreciated by those having ordinary skill in the art that while a specific horizontal style transition has been disclosed, any other suitable transition effect may be substituted without departing from the scope of the present disclosure.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A graphical user interface method comprising:
generating a first interface panel for a first menu item and including a first set of graphical content;
displaying the first interface panel in a primary display area, the primary display area having an outer perimeter;
displaying exclusively a first descriptor associated with the first menu item in a menu display area, the menu display area being located outside the outer perimeter of the primary display area;
receiving an input command on the menu display area;
generating, in response to the input command, a second interface panel for a second menu item and including a second set of graphical content different from the first set of graphical content, an input command transition relationship being defined between the first interface panel and the second interface panel, and the received input command corresponds to the input command transition relationship;
displaying the second interface panel in the primary display area;
displaying exclusively a second descriptor associated with the second menu item in the menu display area;
displaying a menu transition effect between the displaying the first descriptor and the displaying the second descriptor; and
displaying a panel transition effect between the displaying the first interface panel and the displaying the second interface panel corresponding to the input command transition relationship;
wherein the displaying the menu transition effect and the displaying the panel transition effect is simultaneous.

2. The method of claim 1, further comprising:
displaying a panel transition effect between the displaying of the first interface panel and the displaying of the second interface panel corresponding to the input command transition relationship.

3. The method of claim 1, wherein the input command is a horizontal swipe from a first point within the menu display area to a second point within the display area.

4. The method of claim 3, wherein the swipe has a leftward direction and the first point within the menu display area is right of the second point.

5. The method of claim 3, wherein the swipe has a rightward direction and the first point within the menu display area is left of the second point.

6. The method of claim 1, wherein the menu display area is located below the primary display area.

7. The method of claim 1, wherein the menu display area is located adjacent to an expansion button.

8. The method of claim 1, wherein the first interface panel is independently navigable.

9. The method of claim 8, wherein the menu display area is persistent and remains static.

10. The method of claim 1, wherein the received input command is a touch swipe that corresponds to the input command transition relationship.

11. The method of claim 1, wherein the outer perimeter of the primary display area is rectangular in shape.

12. The method of claim 11, wherein at least two sides of the rectangular-shaped outer perimeter are substantially adjacent to an outer edge of the user interface.

13. The method of claim 12, wherein the menu display area is located below the primary display area.

14. An article of manufacture comprising a non-transitory program storage medium readable by a user computing device, the medium tangibly embodying one or more programs of instructions executable by the user computing device to perform a graphical user interface method comprising:
generating a first interface panel for a first menu item and including a first set of graphical content;
displaying the first interface panel in a primary display area, the primary display area having an outer perimeter;
displaying exclusively a first descriptor associated with the first menu item in a menu display area located outside the outer perimeter of the primary display area;
receiving an input command on the menu display area;
generating, in response to the input command, a second interface panel for a second menu item and including a second set of graphical content different from the first set of graphical content, an input command transition relationship being defined between the first interface panel and the second interface panel, and the received input command corresponds to the input command transition relationship;
displaying the second interface panel in the primary display area;
displaying exclusively a second descriptor associated with the second menu item in the menu display area;
displaying a menu transition effect between the displaying the first descriptor and the displaying the second descriptor; and
displaying a panel transition effect between the displaying the first interface panel and the displaying the second interface panel corresponding to the input command transition relationship;
wherein the displaying the menu transition effect and the displaying the panel transition effect is simultaneous.

* * * * *